United States Patent [19]

Bright

[11] Patent Number: 4,653,166
[45] Date of Patent: Mar. 31, 1987

[54] APPARATUS FOR ASSEMBLING FINISHING AND SEALING STRIPS

[75] Inventor: Robert G. Bright, Viersen, Fed. Rep. of Germany

[73] Assignee: Draftex Industries Limited, Edinburgh, Scotland

[21] Appl. No.: 688,602

[22] Filed: Jan. 3, 1985

[30] Foreign Application Priority Data

Jan. 11, 1984 [GB] United Kingdom ................ 8400647

[51] Int. Cl.⁴ .......................................... B23P 19/02
[52] U.S. Cl. ...................................... 29/235; 29/451; 29/281.4; 277/1; 277/9.5
[58] Field of Search ...................... 29/235, 451, 281.4, 29/809; 277/9.5, 11, 1

[56] References Cited

U.S. PATENT DOCUMENTS

| 2,944,335 | 7/1960 | Kabel ................................... 29/235 |
| 3,015,859 | 1/1962 | Bloom ............................... 264/261 X |
| 3,186,333 | 6/1965 | Hoffman et al. ................. 29/235 X |
| 3,281,927 | 11/1966 | Buslaff ................................ 29/235 |
| 3,350,767 | 11/1967 | Yannuzzi ............................ 29/235 |
| 3,455,011 | 7/1969 | Harding .............................. 29/235 |
| 3,698,778 | 10/1972 | Townsend et al. .............. 29/235 X |
| 4,091,521 | 5/1978 | Dygert .............................. 29/235 X |
| 4,148,125 | 4/1979 | Hanser .............................. 29/235 X |
| 4,172,313 | 10/1979 | Takahashi .......................... 29/235 |
| 4,435,888 | 3/1984 | Olderaan ........................... 29/235 |

FOREIGN PATENT DOCUMENTS

| 2286029 | 4/1976 | France . |
| 901482 | 7/1962 | United Kingdom . |
| 1513729 | 6/1978 | United Kingdom . |
| 2120712 | 12/1983 | United Kingdom . |
| 2127884 | 4/1984 | United Kingdom . |

Primary Examiner—Charlie T. Moon
Attorney, Agent, or Firm—Leydig, Voit & Mayer

[57] ABSTRACT

Apparatus for fitting a sealing strip to a mounting flange running around a motor vehicle door opening is disclosed. The sealing strip is preferably in the form of a closed ring and is longitudinally resilient having a channel-shaped gripping section and a soft sealing section. A jig is in the form of an outer plate which is larger in area than the door opening defined by the flange. The strip in ring form is placed on this outer plate and then pulled inwardly by gripping fingers so as to distort it into a shape limited by arm ends and to take up a peripheral size less than the size of the door opening. The jig then positions the seal, which is partially compressed between the outer plate and an inner plate, within the door opening. The gripping fingers are then released and the arm ends move outwardly so as to press the gripping section of the sealing strip onto the flange.

24 Claims, 16 Drawing Figures

APPARATUS FOR ASSEMBLING FINISHING AND SEALING STRIPS

BACKGROUND OF THE INVENTION

The invention relates to finishing and sealing strips and to apparatus and methods for fitting them into position. More specifically, it relates to apparatus and methods for automatically fitting such strips in position such as, for example, onto a motor vehicle body.

BRIEF SUMMARY OF THE INVENTION

According to the invention, there is provided apparatus for mechanically assembling a longitudinal finishing or sealing strip into position on a receiving surface, comprising jig means for temporarily holding the sealing strip in a first configuration, means for moving the jig means from a first, seal-receiving, location to a second location adjacent to the receiving surface, and means for causing the jig means to move the strip out of the first configuration into a second configuration on the said surface.

According to the invention, there is also provided apparatus for assembling a channel-shaped sealing or finishing strip in position on a mounting flange running continuously around an opening, the strip being in a continuous loop sized to fit the opening, comprising jig means having a plurality of mounting members mounted for movement along lines radiating outwards from a datum, mens for placing one of the said loops peripherally outwards of the mounting members when they are in a retracted position, gripping means for gripping the sealing strip at positions along the loop between the mounting members and for pulling the gripped points of the strip towards the said datum so as to pull the strip into contact with the mounting members and to hold the strip in a partially contracted or folded position, means for moving the jig means into juxtaposition with the said opening so that the partially contracted or folded strip is peripherally inwards of the mounting flange, and means for releasing the gripping means and for moving the mounting members outwardly away from the datum so as to push the strip onto the flange.

According to the invention, there is further provided a method of automatically mounting a sealing or finishing strip of continuous loop or ring form on a mounting surface running around an opening, comprising the steps of receiving one of the strips, partially collapsing it inwardly of the loop or ring so as to reduce its contained area, placing the partially collapsed strip within the opening, and reforming it into its normal shape so as to expand its contained area and place it into position on the mounting surface.

BRIEF DESCRIPTION OF THE DRAWINGS

Apparatus and methods according to the invention for automatically fitting sealing strips in position on a motor vehicle body will now be described, by way of example only, with reference to the accompanying diagrammatic drawings in which.

DESCRIPTION OF PREFERRED EMBODIMENTS

Figure 1:
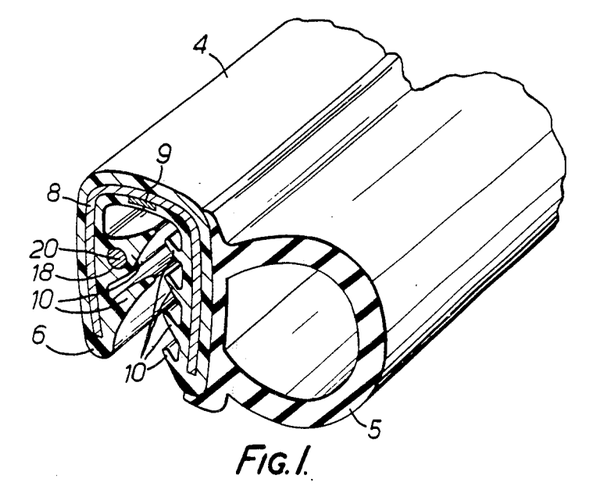
FIG. 1 is a perspective view of one of the sealing strips.

As shown in FIG. 1, one for of sealing strip which may be assembled into position on a motor vehicle body by means of the apparatus and method to be described comprises a gripping section 4 and a sealing section 5. The gripping section 4 is channel-shaped in cross-section and is made up of extruded plastics or rubber material 6 in which is embedded a flexible metal carrier 8. The carrier 8 may be of any suitable form. For example, it may comprise a plurality of side-by-side U-shaped elements either connected together or completely disconnected from each other. Instead, it could be formed from looped wire. The plastics or rubber material 6 may have embedded in it an inextensible tape 9 and is formed with integral gripping lips 10. In this particular example, the gripping section 4 is provided with a hollow tubular bore 18 through which extends, for at least part of the length of the sealing strip, a hardened steel wire 20. In use, the sealing strip is to be fitted around an opening, such as a door opening, in a motor vehicle body so that the gripping section 4 grips the flange which runs around the door opening. The gripping section 4 is so mounted that it supports the sealing section 5 around the door opening in such position that the door closes sealingly onto, and partially compresses, the sealing section 5 which is advantageously made of sponge rubber or the like.

Figure 2:
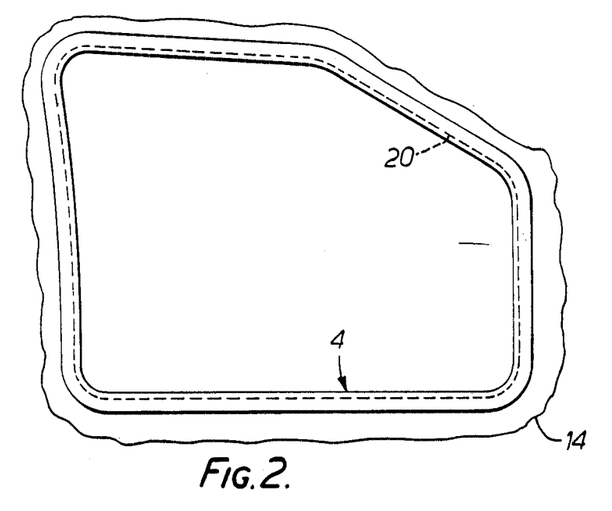
FIG. 2 is a side elevation showing the sealing strip of FIG. 1 in position on the vehicle body.

It will be appreciated, however, that the method and apparatus to be described are not restricted to use with the particular sealing strip shown in FIGS. 1 and 2.

In order to suit a particular vehicle door opening, a length of the sealing strip shown in FIG. 1 is selected to suit the peripheral length of the door opening and then joined together to form a "ring". FIG. 2 shows such a ring of the sealing strip in position in a motor vehicle body door opening, the gripping section 4 being mounted on the flange 14. FIG. 2 also shows, dotted, the lengths of hardened steel wire 20 in the bore 18 of the gripping section, each such length normally extending between, but not always around, respective pairs of bends in the ring.

Figure 3:
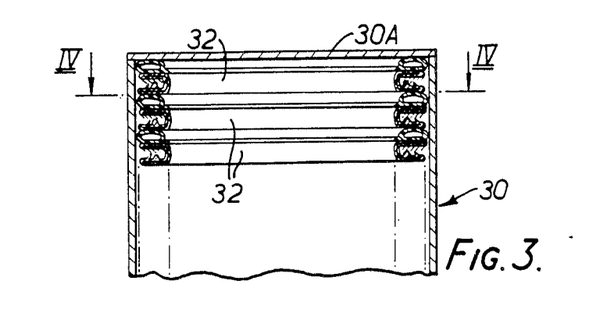
FIG. 3 is a horizontal cross-section through a magazine containing a plurality of the sealing strips and forming part of the apparatus.
Figure 4:
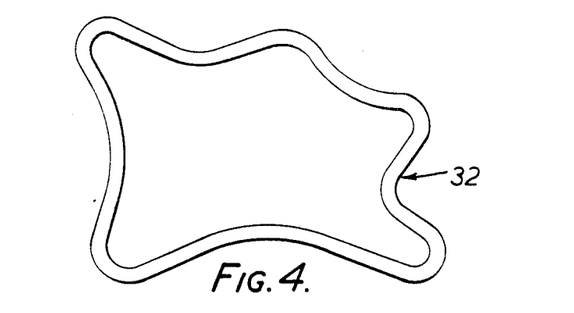
FIG. 4 is a section of the line IV—IV of FIG. 3 showing one of the sealing strips in position in the magazine of FIG. 3.

For use in the assembly apparatus to be described, a number of pre-formed rings are packed together in a special box or magazine 30, as shown in section in FIG. 3. As shown in FIG. 3, the sealing strips (indicated at 32) are mounted side by side so as to be aligned with respective side-by-side vertical planes. However, the size of the magazine is advantageously less than the size of the rings when in their expanded form (that is, is less than the size of the vehicle body door opening). As shown in FIG. 4, therefore, the sealing strips 32 are each in contracted or partially folded form in the magazine, the longitudinal sides of the ring being flexed inwardly; the lengths of hardened steel wire 20 bend, under tension, to allow such contraction or partial folding. This arrangement clearly enables the size of the magazine 30 to be reduced, thus saving space.

Figure 10:
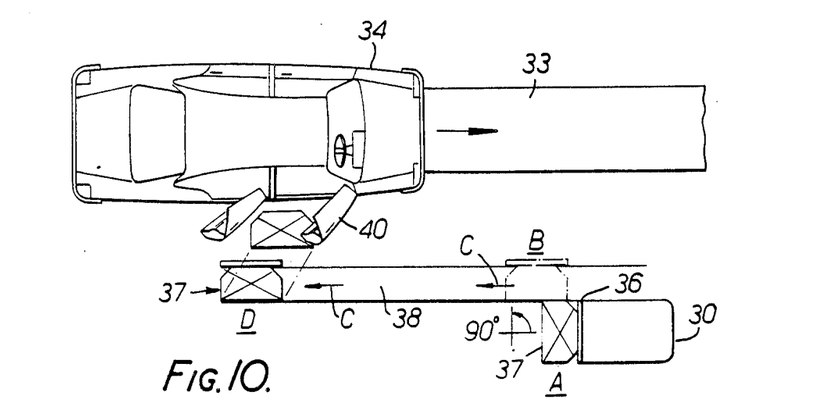
FIG. 10 is a diagrammatic plan view of an assembly track and a partially built motor vehicle body thereon, illustrating how the seal is assembled automatically onto the motor vehicle body.

FIG. 10 shows in diagrammatic form an assembly track 33 along which motor vehicle bodies (only one shown at 34) move during their assembly. In use, a magazine 30 containing a number of the door seals is mounted in a fixed position at the side of the assembly track. In a manner to be described in more detail below, a fitting jig 36 mounted on a carrier 37 picks up a sealing strip 32 from the magazine 30 as shown at position A. The jig 36 is then moved through 90 degrees as shown at B with the sealing strip 32 in position and moves along a subsidiary track 38 in the direction of the arrows C.

When it reaches position D, the jig then moves towards a door opening of the vehicle body 34, the vehicle door 40 being already assembled to the body but being open, the jig being located and clamped in position. In a manner to be explained in detail, the fitting jig 36 then assembles the sealing strip 32 in position on the flange around the door opening.

The jig 36 with its track 38, is mounted on a movable base (not shown). During the assembly process carried out by the jig, the motor vehicle body 34 may be halted on the assembly track or may still be moving. In the latter case, the base will move along the track with the vehicle body 34 carrying the jig 36 and track 38 with it so that there is no relative movement between the jig and the vehicle. The base may be arranged to become temporarily attached to the vehicle body (e.g. by an arm locating in the jacking point of the vehicle) so as to be drawn along by the vehicle.

After fitting the sealing strip in position on the vehicle body, the jig 36 is returned to the track 38 and moves along the track in the direction opposite to the arrows C, turns through 90 degrees, picks up another sealing strip and the procedure described then repeats for the rear door opening of the vehicle body 34; and so on for the next vehicle body on the track 33.

Obviously, a similar arrangement would be mounted on the opposite side of the assembly track 33 for mounting seals on the left hand door openings of the vehicle body.

Figure 5:
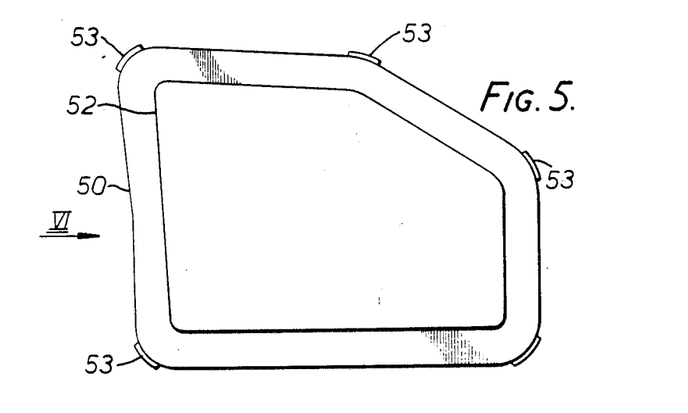
FIG. 5 is a side elevation of a fitting jig forming part of the apparatus.
Figure 6:
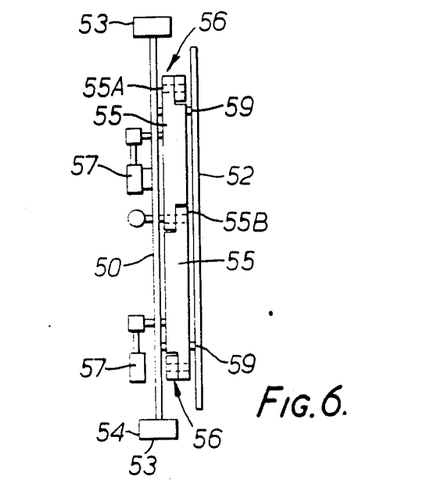
FIG. 6 is an end view of the jig of FIG. 5 in the direction of the arrow VI of FIG. 5.
Figure 7:
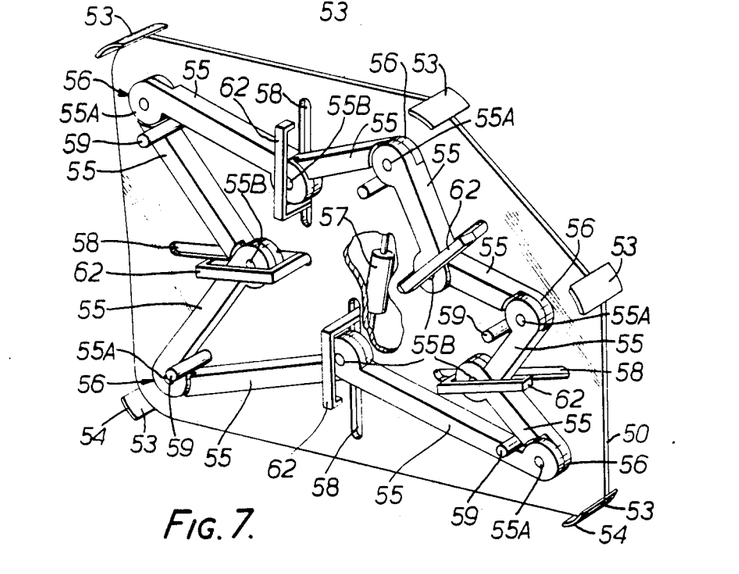
FIG. 7 is a perspective view of the jig corresponding to that of FIG. 5 but showing one of its plates removed.

FIGS. 5, 6 and 7 illustrate the fitting jig 36. It is in the form of two rigid guide plates 50 and 52. (FIG. 5) which are suitably mounted in spaced apart relationship by means of a series of mounting bosses 59 (FIGS. 6 and 7). Each of the plates 50 and 52 is shaped to match the peripheral shaped of the door opening in the vehicle body 34, although the plate 50 is slightly larger in size than the door opening and the plate 52 is slightly smaller.

Locating adjustable guides 53 are attached around the periphery of the plate 50 and extend over its peripheral edge preferably at its corners as shown in FIGS. 5, 6, 7 and 11, terminating in locating ends 54. FIG. 7 shows the jig 36 with the plate 52 removed so as to reveal the internal mechanism. The mechanism comprises ten (in this example) pivotted arms 55. The arms are pivotted at pivots 55A and 55B, two such pivots being shown in FIG. 7A. At each pivot 55A the arms have curved ends 56. Piston-cylinder assemblies 57 (only one shown in FIG. 7) are fixed to the plate 52 and can move the pivots 55B radially inwards and outwards, the pivots sliding in slots 58. As they are moved inwards, the arms 55 pivot to assume the positions shown in FIG. 7, the curved ends 56 moving inwards to positions limited by stops 59. As they move outwards, the arms pivot and respective pairs of arms straighten up. This also has the effect of moving the pivots 55A outwards carrying with them the arm ends 56.

Five gripping fingers 62 extend outwardly from the pivots 55B and are likewise moved radially inwards and outwards by the piston-cylinder assemblies 57. The fingers themselves can also be controlled to move between gripping and releasing states.

The piston-cylinder assemblies 57, and the fingers 62, are controlled by an automatic control system not shown to perform a sequence of predetermined operations.

Figure 8:
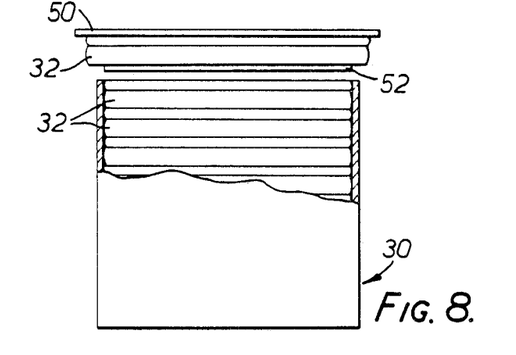
FIG. 8 is a horizontal elevation of the magazine of FIG. 3 but also showing the jig in a seal-receiving position in relation thereto.

When the magazine pack 30 is in position as shown at A in FIG. 10, one of its ends is removed. FIG. 8 shows the magazine with its end 30A removed and also shows the jig 36 in the pick-up position corresponding to that shown at A in FIG. 10. With the jig in this position, the piston-cylinder assemblies 57 have pushed the pivots 55B fully outwards. The fingers 62 extend beyond the plate 52 and enter slots (not shown) in the sides of the magazine 30 to enable the fingers to hook onto the outermost sealing strip 32 in the magazine which is pulled outwardly of the magazine onto the jig as shown in FIG. 8. Instead, the end of the magazine may have associated with it a framework including movable arms which pull the outermost sealing strip 32 out of the magazine and place it on the jig.

In either case, however, as soon as the outermost sealing strip leaves the magazine 30, it will spring outwardly from its contracted or partially folded state to assume substantially its proper, uncompressed, state, that is, a shape matching the shape of the door opening. The hardened steel wires 20 provide the necessary resilience to achieve this. As shown in FIG. 8, therefore, the expanded sealing strip 32 has a larger periphery than the plate 52 of the jig 36 and thus slips over the periphery of this plate to lie in contact with the outer peripheral edge of the plate 50. The fingers 62 are then retracted by the piston-cylinder assemblies 57 so as to pull the sealing strip into the gap between the plates 50 and 52. The sealing strip therefore now assumes the position shown in FIG. 9 which shows the jig 36 with the plate 52 removed. As shown here, the fingers 62 have pulled the sealing strip 32 between the plates 50 and 52 of the fitting jig 36 and, in combination with the arm ends 56, cause it to assume a partially collapsed shape similar to that which it had inside the magazine 30. The sealing strip 32 is held in this position while the jig 36 moves along the track 38 as already explained in connection with FIG. 10.

Figure 11:
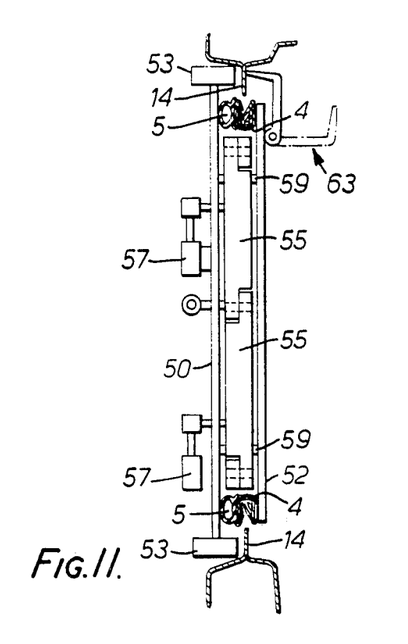
FIG. 11 is a horizontal cross-section through part of the door of the motor vehicle body showing the seal being assembled thereon.

As the mounting jig 36 on its carrier 37 moves towards the vehicle door opening (see FIG. 10), the locating ends 54 on the jig move into contact with the vehicle body in the immediate region of the flange 14 surrounding the door opening. This is illustrated diagrammatically in FIG. 11. The locating ends 54 provide final positional adjustment of the mounting jig which is capable of slight movement with respect to the carrier 37 for this purpose, thus providing two-dimensional location of the jig. As shown in FIG. 11, this positioning of the jig 36 ensures that the mounting plate 52 of the jig passes through the door opening, and the sealing strip 32, in position between the plates 50 and 52, becomes aligned with, but held inwardly of, the flange 14. FIG. 11 shows how the plates 50 and 52 are spaced apart by such distance that the sealing section 5 of the sealing strip 32 is held in slightly compressed format.

The plate 50 may advantageously carry additional fingers on the opposite side to the plate 52, as shown at 63 in FIG. 11, these fingers extending inside the door opening and being pivotable to grip the inside bodywork and secure the jig firmly to the vehicle during the assembly operation.

The control mechanism then releases the fingers 62 of the jig and energises the piston-cylinder assemblies 57 to straighten the arms 55 and to push the arm ends 56 outwardly. This causes the sealing strip 32 to be pushed out from between the plates 50 and 52 so that its gripping section 4 grippingly embraces the flange 14. It will be appreciated that the arms 55 themselves push on the lengths of sealing strip between the arm ends 56 and press its gripping section 4 onto the flange 14. The resilience of the hardened steel wires 20 also helps by causing the sealing strip to snap into position onto the flange 14.

The jig is then retracted in a manner explained and the procedure repeats. The plate 52 therefore has to have such peripheral size that it can retract from the door opening after the sealing strip has been fitted onto the flange.

Figure 7A:
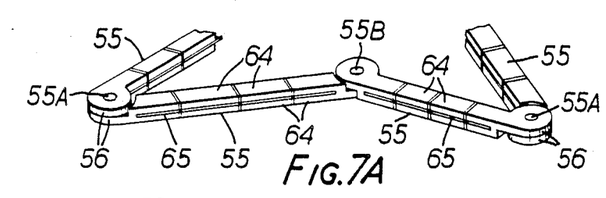
FIG. 7A shows part of the mechanism of FIG. 7 to an enlarged scale and illustrates a possible modification.

Although the description and drawings have shown the plates 50 and 52 as being flat, this is not in fact the case normally as the flange 14 around the door opening does not normally all lie in a single plane but matches the curvature of the side of the vehicle body. The plates 50 and 52, and the arms 55, are therefore normally curved to match, the arms being made flexible to match the changing curvature during their movement. FIG. 7A shows a modified form of the arms 55 in which, in order to provide the required flexibility, they are made of individual blocks 64 of suitable material attached to flexible metal strips 65.

It will be appreciated that insofar as the door seals differ between front and rear doors, or between successive vehicle bodies (e.g. two and four door models) on the assembly track 33, the magazine 30 can be packed accordingly.

Although the above description has assumed that the sealing strips are of the form shown in FIG. 1, with hardened steel wires 20, other forms of sealing strip may be used with the apparatus described. Although the hardened steel wires 20 are useful in helping to cause the sealing strip to straighten and snap onto the flange 14, they are not essential. Sealing strips without such wires can be pressed into position on the flange merely by the arms 55.

The plates 50 and 52 may be adapted to carry other forms of assembly arrangements instead of the arms 55. For example, an arm could be mounted between the plates 50 and 52 which would be guided round the flange to press the sealing strip in place.

A modified form of the apparatus is shown in FIGS. 12 to 15. In this form of the apparatus, the plates 50 and 52 are not used. Instead, a number of individual mounting units, to be described below, are mounted, on a support, so as to be positioned by the support at positions corresponding to the pivots 55A of the apparatus already described—in other words, at the positions where there are bends or corners in the fitted sealing strip. The arms 55 (see FIG. 7) extend between the mounting units. The gripping fingers 62 (see FIG. 7) would be mounted in positions corresponding to those in FIG. 7. This modified arrangement is advantageous in certain circumstances. Thus, the same support can be used for a large number of differently sized door openings, it being only necessary to alter the position on the support of the mounting units and the gripping fingers and possibly to alter the arms 55; it is not necessary to use differently sized mounting plates.

Figure 12:
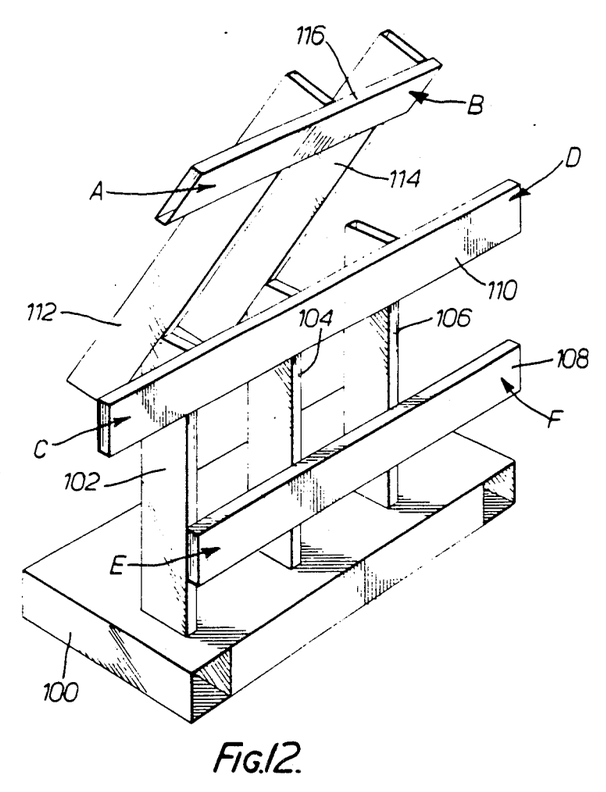
FIG. 12 is a perspective view of a support for use with a modified form of the apparatus.

FIG. 12 is a diagrammatic perspective view of one form which the support can take. As shown, it has a base 100 from which upwardly extend three vertical legs 102, 104 and 106, these supporting horizontal bars 108 and 110. Two of the legs, 102 and 104, support inclined arms 112 and 114, these in turn supporting a perpendicular bar 116. The connections between the legs, arms and bars are by means of adjustable brackets (not shown). The brackets are arranged so that the bars 108, 110 and 116 can be adjusted in a horizontal direction on the legs or arms which support them, and so that the arms 112 and 114 can be displaced both longitudinally and angularly with respect to the legs 102 and 104. The mounting units to be described are fitted to the bars 108, 110 and 116 at at least some of the positions shown at A, B, C, D, E and F so as to be positioned in a manner corresponding to the arm ends 56 in FIG. 7.

Figure 9:
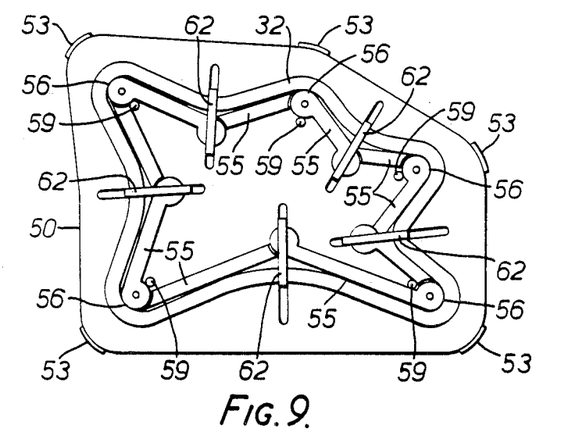
FIG. 9 is a side elevation of the jig corresponding to that of FIG. 5 but with part removed to show a sealing strip in position therein.

Gripping fingers would likewise be mounted on the bars 108, 110 and 116 at positions corresponding to the gripping fingers 62 of FIG. 9.

The mounting units and gripping fingers would be mounted on the bars in a manner which permitted them to be adjusted with reference to the bars. It will thus be appreciated that these adjustments enable the apparatus to support a sealing strip designed for a variety of differently sized door openings, and then to place the sealing strip on to the door openings.

Figure 13:
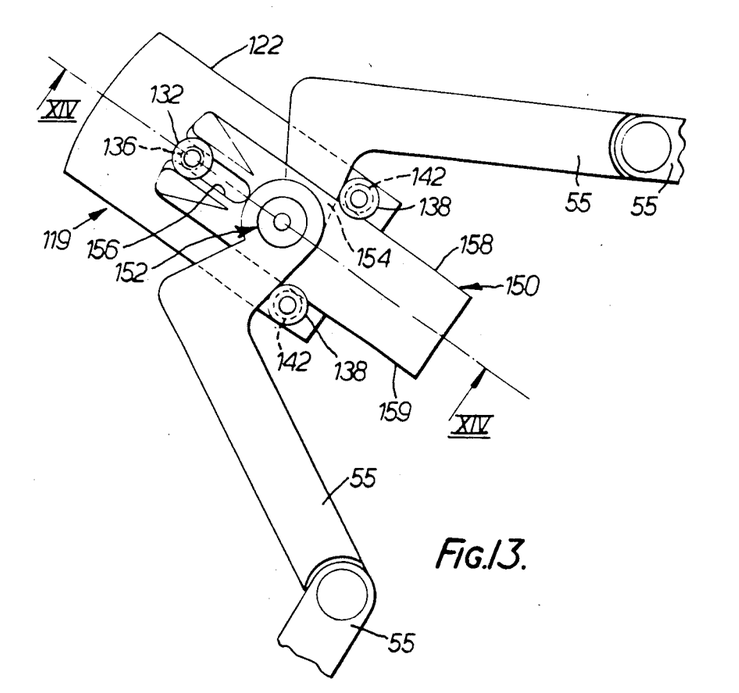
FIG. 13 is a diagrammatic view of part of a mounting unit for use on the support of FIG. 12, showing the unit in a retracted position.
Figure 14:
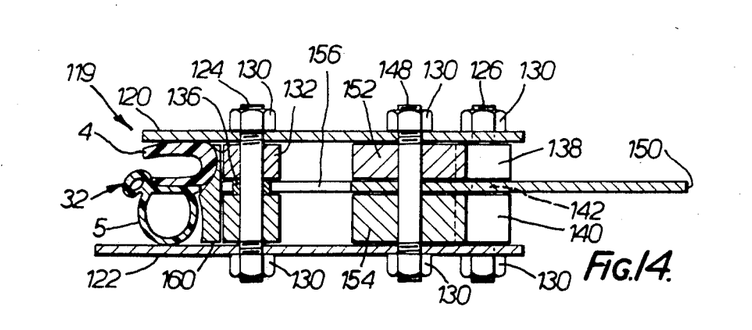
FIG. 14 is a section on the line XIV—XIV of FIG. 13.
Figure 15:
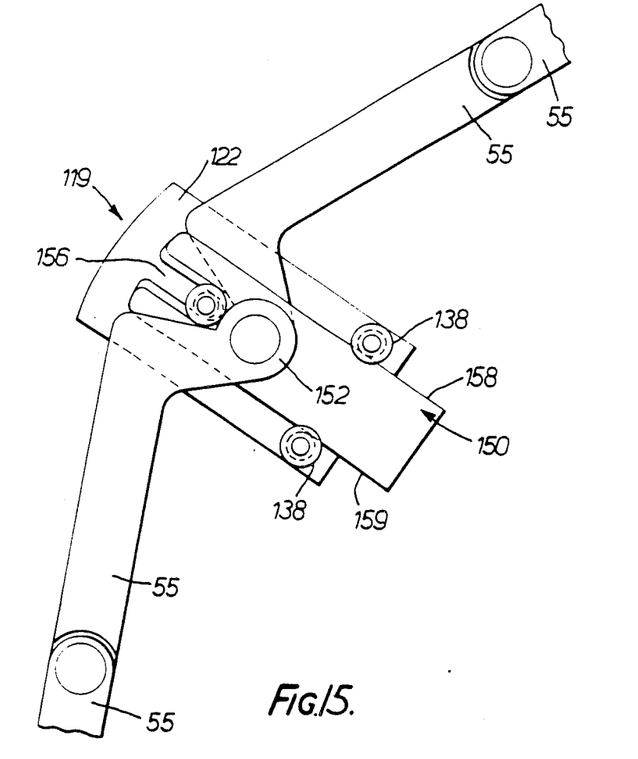
FIG. 15 corresponds to FIG. 13 but shows the unit in an extended position.

FIGS. 13, 14 and 15 illustrate a mounting unit 119 in the attitude which it would take when mounted at position C in FIG. 12. FIG. 14 is a section on the line XIV—XIV of FIG. 13. As shown, the mounting unit has inner and outer plates 120 and 122 (plate 122 being slightly smaller than plate 120) which are fixed in relation to each other by bolts 124, 126 and 128 and corresponding nuts 130. The bolt 124 carries a pair of rotatable spacers 132 and 134 and a rotatable roller 136. Each of the bolts 126 and 128 carries a pair of rotatable spacers 138 and 140 and a rotatable roller 142.

As shown in FIG. 13, in which the inner guide plate 122 is removed, arms 55 (corresponding to the arms 55 of the first embodiment described) are pivotally connected to each other by means of a pivotal connection 146. The pivotal connection is by means of a bolt 148 (see FIG. 14) which passes through a slide 150 and is rotatably connected to an arm end 152 at the end of one of the pair of arms 55 shown in FIG. 13 and an arm end 154 at the end of the other of the arms 55. The arm ends 152 and 154 are thus between the plates 120 and 122.

The slide 150 has a slot 156 which engages the roller 136, and the opposite longitudinal edges 158 and 159 engage the rollers 152 on the bolts 126 and 128.

The slider 150 is connected to a piston-cylinder assembly corresponding to one of the assemblies 57 in the previous embodiment.

FIGS. 13 and 14 show the slide 150 fully retracted. As shown in FIG. 14, the sealing strip 32 is held in position between the inner and outer plates 120 and 122, being held therein by the resilience of the gripping and sealing sections 4 and 5 of which it is made. The slide 150 carries a mount 160 at its end which extends between the plates 120 and 122 and is shaped to accommodate the sealing strip.

As shown in FIG. 13, retraction of the slide 150 causes the arms 55 to pivot relative to each other, and in this configuration the sealing strip (which is not shown in FIG. 13) would assume the relatively collapsed configuration corresponding to that shown in FIG. 9.

As already explained, mounting units 119 corresponding to that shown in FIGS. 13 and 14 would be mounted at the required positions on the support illustrated in FIG. 12. The mounting units may be mounted in position on the bars 108, 110 and 116 by means of the bolts 124, 126 and 128. With the mounting units fixed in position, the resultant structure is ready to receive a sealing strip. The structure can be arranged to pick up a sealing strip from a magazine in the same manner as previously described. The slides 150 of all the mounting units are then retracted (to positions corresponding to that shown in FIG. 13) and the gripping fingers 62, mounted at positions between the mounting units, would also be retracted, so as to contract the sealing strip into partially folded form, as previously described, and thereby to flex the longitudinal sides of the ring-form of the sealing strip inwardly. The sealing strip is thus pulled into firm contact with the mount 160 and the inner faces of the plates 120 and 122 as illustrated in FIG. 14.

The structure with the sealing ring held in this position is then moved up into a position adjacent the door opening of the vehicle, in the manner described with reference to FIG. 10. The gripping fingers then release their hold on the sealing strip, in the manner previously described, and the piston-cylinder assemblies 57 then drive all the slides 150 outwards. This causes the arms 55 to assume the position shown in FIG. 15, the arms being straightened relative to each other at their pivotal interconnections. As each slide 150 moves outwardly, between the respective inner and outer plates 120 and 122, the sealing strip 32 on the mounts 160 is pushed outwardly and on to the flange surrounding the vehicle door opening.

The arms 55 may be constructed in the manner shown in FIG. 7A. It may also be advantageous to make them slightly longitudinally resilient. As before, means would be provided for sensing the position of the support structure relative to the vehicle door opening so as to ensure that it was in the correct location for the gripping section 4 of the sealing strip to be pushed properly onto the mounting flange.

It will be appreciated that the apparatus and methods described can be adapted to fit window channels and seals for other vehicle body openings (of luggage and engine compartments, for example) in position. The window channels or seals may be fitted before the doors or lids for such openings have been fitted or after such fitting.

The apparatus and methods described are particularly advantageous because very little space within the vehicle body is required for carrying out the assembly process. In particular, the apparatus and methods can operate very satisfactorily even when there is little or no clearance between the flange and interior parts (e.g. the dashboard) of the vehicle. The apparatus and methods described are also advantageous because there may be less risk of damage to the sealing strips than is the case with manual fitting where excessive force may be used.

What is claimed is:

1. Apparatus for mechanically assembling a longitudinal finishing or sealing strip into position on a receiving surface, the strip being in the form of a pre-formed closed loop for mounting around the periphery of an opening, comprising
   jig means for temporarily holding the sealing strip in a first configuration in which the strip is at least partly contracted or folded and in which portions of the strip are pulled inwardly towards the center of the loop, the jig means comprising a plurality of mounting members respectively mounted for movement along lines radiating outwardly from a datum, and a plurality of finger means extending along other lines radiating outwardly from the datum, whereby when the strip is positioned so that the loop thereof lies outside the mounting members, the finger means respectively releasably grip different peripheral points of the strip and pull those points towards the said datum so as to hold the strip in contact with the mounting members and thus to hold the strip in the first configuration,
   means defining a jig-constraining path leading between a first, sealing strip-receiving location to a second location adjacent the said receiving surface
   first motorised means for mechanically driving the jig means from said first location to said second location whereby the jig means receives said sealing strip at said first location, temporarily holds the sealing strip in said first configuration and conveys it in that configuration to the second location, and
   second motorised means for causing the jig means when in the second location to move the strip out of the first configuration into a second configuration on the said surface, the second motorised means including means for releasing the finger means when the jig means is in the said second location and for moving the mounting members outwardly and away from the said datum so as to move the strip into the second configuration.

2. Apparatus according to claim 1 for use where the strip is longitudinally resilient, and in which the jig means comprises means to hold the strip in the first configuration against the resilience of the strip, whereby when the jig means releases the strip the resilience assists in moving the strip into the second configuration.

3. Apparatus according to claim 1, in which the mounting members are mounted at pivoting joints of a plurality of pivotally interconnected arms which have other pivoting joints between the mounting members, the arms being mounted to lie substantially in the plane of the loop in use, whereby movement of the said other pivoting joints towards the centre of the loop moves the mounting members inwardly along the said lines.

4. Apparatus according to claim 3, in which the said finger means are mounted to move along the said lines by connecting them to the said other pivoting joints.

5. Apparatus for assembling a channel-shaped sealing or finishing strip in position on a mounting flange running continuously around an opening, the strip being in a continuous loop sized to fit the opening, comprising jig means having a plurality of mounting members mounted for movement along lines radiating outwards from a datum, so as to move from a retracted position relatively close to the datum to an extended position relatively further from the datum, mounting means positioned at a first location for placing the strip on the jig means so that its said loop lies peripherally outwards of the mounting members when they are in the retracted position, gripping means mounted on the jig means for gripping the sealing strip at positions along the loop between the mounting members when the mounting members are in the retracted position and for pulling the gripped points of the strip towards the said datum so as to pull the strip into contact with the mounting members and to hold the strip in a partially contracted or folded position, means defining a track extending from the first location to a second location adjacent the mounting flange, first motorised means for mechanically driving the jig means along the said track from the first location to the second location and into juxtaposition with the said opening so that the partially contracted or folded strip is peripherally inwards of the mounting flange, and second motorised means for releasing the gripping means and for moving the mounting members outwardly away from the datum and towards the extended position so as to push the strip onto the flange.

6. Apparatus according to claim 5, in which the mounting members are mounted at pivoting joints of a plurality of pivotally interconnected arms which have other pivoting joints between the mounting members, the arms being mounted to lie substantially in the plane of the loop in use, whereby movement of the said other pivoting joints towards the centre of the loop moves the mounting members inwardly along the said lines.

7. Apparatus according to claim 6, in which the said gripping means are mounted to move along the said lines by connecting them to the said other pivoting joints.

8. Apparatus according to claim 5, in which the jig means includes a plurality of locating members for making physical contact adjacent the mounting flange so as to locate the jig means in relation thereto.

9. Apparatus according to claim 5, in which the jig means includes a mounting plate which is larger in area than the said opening and defines a surface substantially parallel with the general plane of the opening when the jig means is in the second location, the mounting plate including means supporting the mounting members for movement across the surface of the mounting plate and between the retracted and extended positions, the said mounting means comprising means for placing a strip in its fully extended loop configuration onto the mounting plate and peripherally outwardly of the mounting members.

10. Apparatus according to claim 9, in which the jig means includes a second mounting plate mounted substantially parallel to the first-mentioned mounting plate with the mounting members positioned between the two plates, the second mounting plate having an area which is less than that of the said opening.

11. Apparatus according to claim 10, in which the mounting plates are each in one piece.

12. Apparatus according to claim 10, in which the mounting plates are each made up from separate parts joined together.

13. Apparatus according to claim 5, in which the mounting members are mounted for respective sliding movement in the plane of the loop in use.

14. Apparatus according to claim 13, including a plurality of pairs of separate plates, the plates of each pair being spaced apart from each other and defining respective surfaces which face each other across a gap between the plates, and in which each mounting member is mounted on and between the plates of a respective said pair so that its said movement between the retracted and extended positions comprises sliding movement across the said surfaces of the pair of plates, the said surfaces being substantially parallel with the general plane of the opening when the jig means is in the second location.

15. Apparatus according to claim 14, comprising a support structure, and in which each said pair of plates is mounted on the support structure such that one edge of one mounting plate of each pair of mounting plates lies on a first line and one edge of the other plate of each pair of mounting plates lies on a second line, the first and second lines substantially matching the shape of the said opening with one such line defining an area slightly larger than the said opening and the other such line defining an area slightly smaller than the said opening, the mounting plates being mounted on the support structure so that the mounting plates defining the second line are capable of moving into the said opening.

16. Apparatus for assembling a channel-shaped sealing or finishing strip in position on a mounting flange running continuously around an opening, the strip being in a continuous loop sized to fit the opening, comprising jig means including a mounting plate which is larger in area than the said opening and a plurality of mounting members mounted on the mounting plate for movement across its surface along lines substantially parallel to its surface and radiating outwards from a datum thereon between retracted and extended positions, mounting means for placing the strip onto the mounting plate so that the said continuous loop of the strip is positioned peripherally outwards of the mounting members when they are in the retracted position, gripping means mounted on the jig means for gripping the sealing strip at positions along the loop between the mounting members and for pulling the gripped portions of the strip towards the said datum so as to pull the strip into contact with the mounting members and to hold the strip in a partially contracted or folded position, means for moving the jig means into juxtaposition with the said opening so that the said surface of the mounting plate is substantially parallel with the general plane of the opening and the partially contracted or folded strip is peripherally inwards of the mounting flange, and means for releasing the gripping means and for moving the mounting members outwardly away from the datum and towards their said extended positions so as to push the strip onto the flange.

17. Apparatus according to claim 16, in which the jig means includes a second mounting plate defining a surface and mounted with that surface substantially parallel to the surface of the first-mentioned mounting plate with the mounting members positioned between the two plates, the second mounting plate having an area which is less than that of the said opening.

18. Apparatus according to claim 17, in which the mounting plates are each in one piece.

19. Apparatus according to claim 17, in which the mounting plates are each made up from separate parts joined together.

20. Apparatus according to claim 16, in which the mounting members are mounted at pivoting joints of a plurality of pivotally interconnected arms which have other pivoting joints between the mounting members, the arms being mounted to lie substantially in the plane of the loop in use, whereby movement of the said other pivoting joints towards the centre of the loop moves the mounting members inwardly along the said lines.

21. Apparatus according to claim 16, in which the said gripping means are mounted to move along the said lines by connecting them to the said other pivoting joints.

22. Apparatus according to claim 16, in which the jig means includes a plurality of locating members for making physical contact adjacent the mounting flange so as to locate the jig means in relation thereto.

23. Apparatus for assembling a channel-shaped sealing or finishing strip in position on a mounting flange running continuously around an opening, the strip being in a continuous loop sized to fit the opening, comprising jig means supporting a plurality of pairs of separate plates, the plates of each pair being spaced apart from each other and defining respective surfaces which face each other across a gap between the plates, the jig means also including a plurality of mounting members each mounted on and between the plates of a respective said pair for sliding movement with respect to the surfaces thereof between a retracted and an extended position, mounting means for placing the strip onto the mounting plates so that the said continuous loop of the strip is positioned peripherally outwards of the mounting members when they are in the retracted position, the mounting members being mounted such that their sliding movement is movement substantially in the plane of the said loop when the latter is so positioned, gripping means mounted on the jig means for gripping the sealing strip at positions along the loop between the mounting members and for pulling the gripped positions of the strip towards the said datum so as to pull the strip into contact with the mounting members and to hold the strip in a partially contracted or folded position, means for moving the jig means into juxtaposition with the said opening so that the said surfaces of the mounting plates are substantially parallel with the general plane of the opening and the partially contracted or folded strip is peripherally inwards of the mounting flange, and means for releasing the gripping means and for moving the mounting members towards their said extended positions so as to push the strip onto the flange.

24. Apparatus according to claim 23, comprising a support structure, and in which each said pair of plates is mounted on the support structure such that one edge of one mounting plate of each pair of mounting plates lies on a first line and one edge of the other plate of each pair of mounting plates lies on a second line, the said first and second lines substantially matching the shape of the said opening with the first line defining an area slightly larger than the said opening and the second line defining an area slightly smaller than the said opening, the mounting plates being mounted on the support structure so that the mounting plates defining the second line are capable of moving into the said opening.

* * * * *